United States Patent [19]

deRaymond et al.

[11] Patent Number: 4,702,499
[45] Date of Patent: Oct. 27, 1987

[54] HINGEABLE SEGMENTED PIPE COUPLINGS

[75] Inventors: Peter G. deRaymond, Nazareth, Pa.; Robert Rung, Hopatcong, N.J.

[73] Assignee: Victaulic Company of America, Easton, Pa.

[21] Appl. No.: 921,970

[22] Filed: Oct. 21, 1986

[51] Int. Cl.[4] .............................................. F16L 17/04
[52] U.S. Cl. .................................. 285/112; 285/367; 285/373; 285/912
[58] Field of Search ............... 285/112, 373, 419, 410, 285/367, 912; 24/279

[56] References Cited

U.S. PATENT DOCUMENTS

| | | | |
|---|---|---|---|
| 2,459,251 | 1/1949 | Stillwagon | 285/112 X |
| 2,752,173 | 6/1956 | Krooss | 285/367 X |
| 3,024,046 | 3/1962 | Frost et al. | 285/112 X |
| 4,408,788 | 10/1983 | Beukema | 285/112 X |
| 4,601,495 | 7/1986 | Webb | 285/112 |

FOREIGN PATENT DOCUMENTS

1196266 11/1959 France ................................ 285/367

*Primary Examiner*—Dave W. Arola
*Attorney, Agent, or Firm*—Abelman Frayne Rezac & Schwab

[57] ABSTRACT

A hingeable segmented pipe coupling includes dual or plural coupling segments which are hingeable relative to each other in the absence of transverse hinge pins, at least one pair of bolting pads including arcuate surfaces which roll with respect to each other, and each of which includes a fulcrum for engagement with a headed securing member associated with those bolting pads. In preferred embodiments, the bolting faces of the bolting pads are contoured to prevent rotational movement of the coupling segments about the axis of the securing member.

32 Claims, 17 Drawing Figures

HINGEABLE SEGMENTED PIPE COUPLINGS

FIELD OF THE INVENTION

This invention relates to segmented pipe couplings of the type comprised of plural segments which are adapted to be assembled around pipes to be sealed and secured, and which are then clamped onto the pipes or clamped to each other by traction bolts or other securing members which extend through bolting pads provided at the respective ends of the coupling segments.

The invention finds application both in "rigid" couplings which are adapted to clamp directly onto the exterior of pipes in order to immobilize the pipes against axial and angular movement relative to each other, and also, in "flexible" couplings in which the bolting pads of the respective coupling segments ultimately become rigidly connected to each other at their bolting faces in encircling relationship with the pipes, the pipes having a limited amount of free play within the assembled coupling such that one pipe can be angled relatively to the other.

While pipes are referred to throughout the following discussion of the present invention, it will be understood that one or both of the pipes can be comprised of fittings such as nipples, elbows, flanged connectors and the like.

Segmented pipe couplings commonly are comprised of two coupling segments each subtending an angle of substantially 180 degrees. The present invention finds application in such segmented pipe couplings, and, also in segmented pipe couplings comprised of more than two couplings segments, and in fact, has particular application to such segmented pipe couplings of larger diameters, and which commonly are comprised of three or more coupling segments, each of which is connected to the other in encircling relationship with the pipes.

Hinged segmented pipe couplings are known in which the respective coupling segments are secured to each other by a transverse pin which extends parallel to the longitudinal axis of the coupling. Such hinged couplings are relegated to relatively light duty use, in that the maximum pressure that can be withstood by such couplings is determined by the strength of the hinge pin and the stress at which the hinge pin will shear under pressure loading of the coupling.

For heavier duty use, couplings having bolting pads at each end of the respective coupling segments are employed, the respective coupling segments being secured to each other in end to end relationship. The present invention has particular application to segmented pipe couplings of this type.

BACKGROUND OF THE INVENTION

A problem commonly encountered with such segmented pipe couplings, particularly when assembling such a coupling a relatively inaccessible location, is the tendency or ready ability of one of the coupling segments to rotate angularly relative to the other about the single traction bolt used for securing a pair of coupling segments to each other. This requires the use of both hands of the workman in correctly assembling the coupling segments around the pipe ends, and, the movement of the coupling segments to bring them into coplanar relationship, such as required in order that keys on the inner peripheries of the coupling segments are properly oriented with respect to grooves provided in the pipe ends, or, with respect to projections provided on the pipe ends.

Until such time as the traction bolts or securing members are properly positioned at each end of the coupling segments, the coupling segments can move relative to each other in a random manner, such that longitudinal axis of one coupling segment can become angled with respect to the next adjacent coupling segment. Prior to tightening down of the traction bolts, the interconnection of the respective coupling segments is non-positive and allows such rotational or angling movement, with the consequence that the axes of the respective coupling segments may become angled relative to the axes of the respective pipes, which themselves are probably out of axial alignment pending tightening down of the coupling. If this occurs, then, proper seating of the keys of the coupling on the pipe ends can not be assured.

In order to reduce this problem, segmented couplings have been proposed in which the bolting faces of the bolting pads are oppositely angled outwardly commencing at the location of intersection of the axis of the traction bolt with the bolting faces of the bolting pads, and away from the next adjacent bolting face of the next adjacent coupling.

This permits insertion and partial tightening down of one of the traction bolts by a determined extent prior to assembly of the coupling onto the pipes, and permits one of the coupling segments to be angled relative to the next adjacent coupling segment in order to faciliate its passage around the pipes, subsequent to which the respective coupling segments are moved inwardly into engagement with the pipe peripheries.

This is of great assistance in that it permits the insertion of one of the traction bolts prior to assembly of the coupling on to the pipes, and greatly facilitates the handling of the coupling prior to its being tightened down onto the pipes.

However, the interconnection between the respective coupling segments still remains non-positive, with the ability of one of the coupling segments to rotate about the axis of the interconnecting traction bolt, and into a position in which it is no longer in coplanar relationship with the next adjacent coupling segment.

A typical example of such a segmented pipe coupling in which the bolting pads are outwardly angled to permit relative hinging movement between the coupling segments after insertion of a traction bolt and prior to the tightening down of the coupling is illustrated in U.S. Pat. No. 3,024,046, Frost et al. issued Mar. 6, 1962.

SUMMARY OF THE INVENTION

The present invention addresses this problem in prior art segmented pipe couplings, and has for its object the provision of pipe coupling segments which can hinge relative to each other to permit their passage over a pipe. Further, the present invention provides a segmented pipe coupling in which the coupling segments are positively restrained from angling relative to each other when in the open hinged position, thus readily facilitating the assembly of the segmented coupling over the pipe peripheries by a workman using only one of his hands to effect that manoeuver.

According to the present invention, the bolting faces of the respective bolting pads of the coupling segments are so formed that in all positions of angular displacement of the coupling segments relative to each other in a plane perpendicular to the axis of the respective coupling segments, contoured surfaces of the juxtaposed bolting faces of the adjacent coupling segments remain in continuous rolling face engagement with each other, and move relative to each other with a rolling action. Thus, canting of one coupling segment relative to the next adjacent segment is precluded.

According to further features of the present invention, the respective bolting faces are provided with interfitting members which further preclude angling of one of the coupling segments relative to the other during hinging movement of the coupling segments and assembly of the coupling onto the pipes.

Further, by the provision of bolting faces in accordance with the present invention, traction bolts at one end of the coupling segments can be replaced by headed pins, which can be inserted at the point of manufacture of the coupling, and, which will remain in-situ at all times during hinging movement of the respective coupling segments relative to each other.

Additionally, the present invention teaches configurations of coupling segments having the ability to hinge relative to each other, and in which the respective coupling segments are identical with each other in all respects, thus eliminating the requirement for separate castings, and a decision on the part of the workman as to how the coupling is to be correctly assembled.

DESCRIPTION OF THE DRAWINGS

The invention will now be described with reference to the accompanying drawings, which illustrate preferred embodiments of the invention, and in which.

DESCRIPTION OF THE PREFERRED EMBODIMENTS

Figure 1:
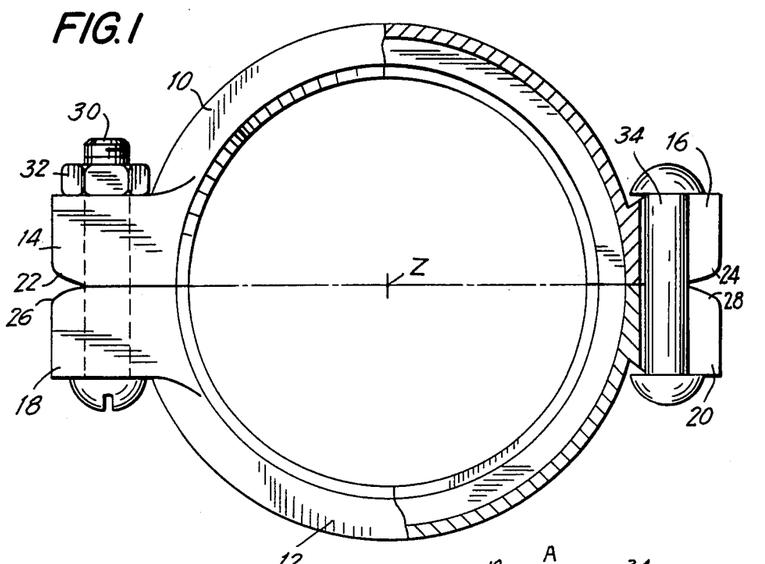
FIG. 1 is a front view of the assembled coupling, shown partially in section for clarity of illustration, and in which the conventional sealing gasket is omitted.

Referring firstly to FIG. 1, a construction of segmented pipe coupling is shown which incorporates two coupling segments 10 and 12 respectively provided with bolting pads 14, 16 and 18, 20 at their respective ends, and which are adapted to receive a conventional sealing gasket (not shown). The respective bolting pads are provided with contoured bolting faces 22, 24, 26, 28, which, as will later appear, either may be identical with each other, such, for example, as in a symmetrical configuration of the bolting segments, or, which each may be different from each other and arranged in coacting pairs, as in an asymmetrical arrangement of the coupling segments.

The respective coupling segments 10 and 12 are secured to each other in any convenient manner, such as by threaded traction bolts 30 and cooperating nuts 32, or, by means of headed pins 34. As will later appear, the shanks of the traction bolts and the headed pins may be of circular or of rectangular transverse cross-section.

Conveniently, headed pins 34 are used at locations at which the coupling segments are to hinge relative to each other, the opposite ends of the coupling segments preferably being secured by conventional traction bolts 30. Traction bolts 30 can, however, be used with equal facility at both ends of the gasket segments. The use of headed pins 34 is, more particularly, as a matter of convenience, in that the pins can be attached to and retained by an assembled pair of gasket segments at the point of manufacture, and, secured against displacement out of the coupling segments, again, in the manner later described.

Without regard to whether headed pins 34 are employed, or whether traction bolts 30 are employed at both ends of the coupling segments, the mode of cooperation and interaction of the pins or traction bolts will be the same provided that the nuts of the traction bolts are tightened down prior to hinging of the coupling segments about their bolting pads.

Figure 2:
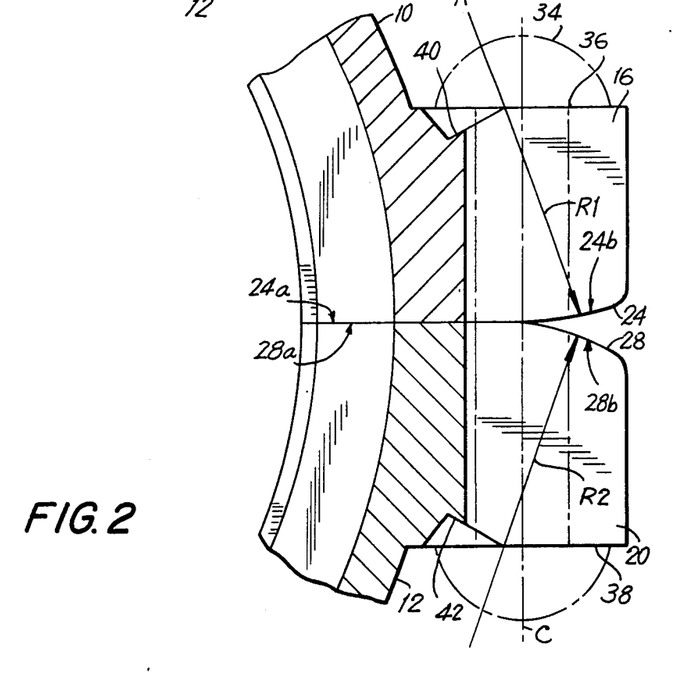
FIGS. 2, 3, and 4 are enlarged fragmentary sections of the right-hand portion of FIG. 1, showing the coupling segments in various positions of hinging movement, from the closed position as illustrated in FIG. 2, through an intermediate position as illustrated in FIG. 3, and, to a fully opened position as illustrated in FIG. 4.
Figures 3, 4:
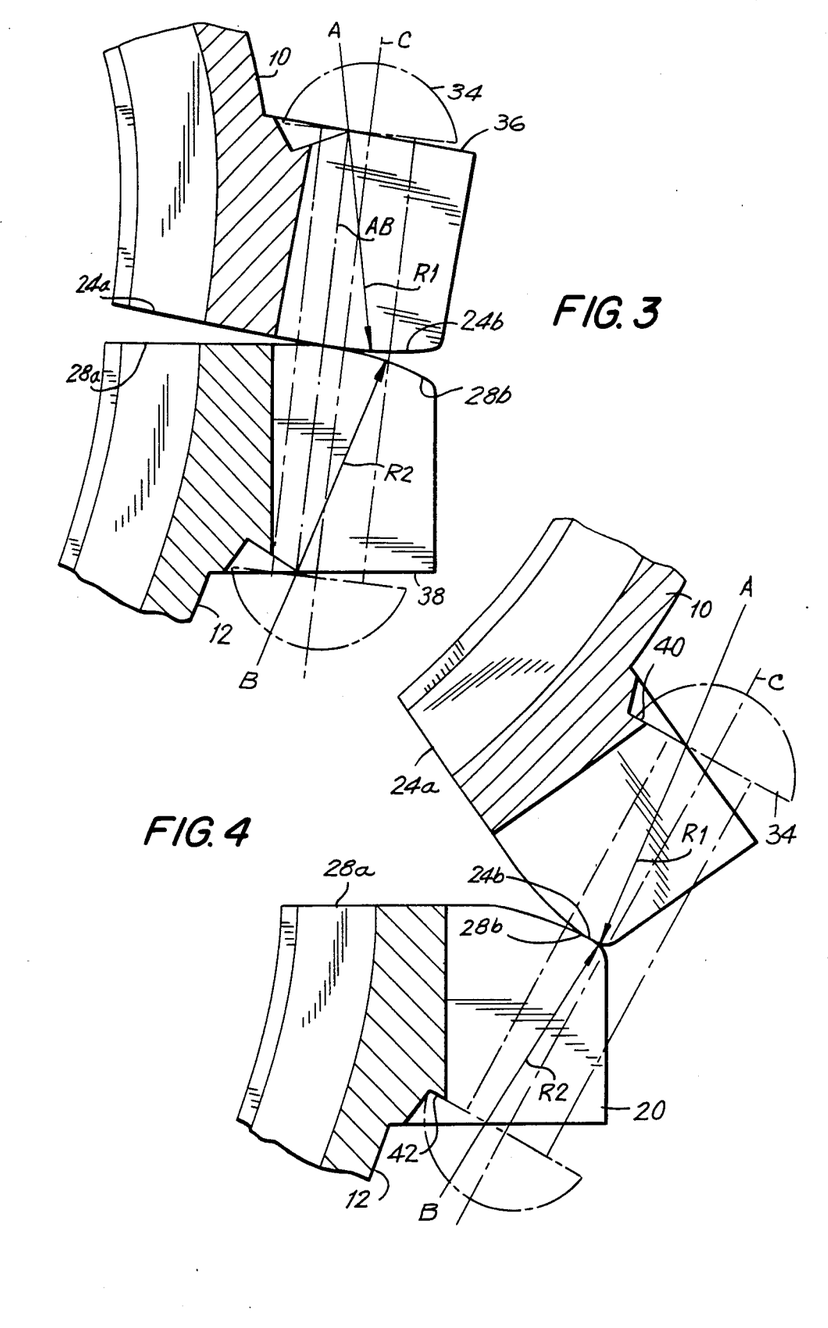

Referring now to FIGS. 2, 3 and 4, the geometry of the respective pairs of bolting pads is discussed, as related to their use in conjunction with a headed pin 34. The headed pin 34 is indicated in chain dotted lines in FIGS. 2, 3, and 4, in order that the critical parameters of the geometry of the bolting pads shall not be obscured.

Referring firstly to FIG. 2, the juxtaposed bolting faces 24 and 28 of the bolting pads 16 and 20, each include a first planar portion 24a, 28a, which, in the closed position of the coupling lies either on the equatorial medial plane of the coupling, or closely adjacent thereto, the optimum being that the planar faces 24a and 28a lie in abutting contact with each other in the closed position of the coupling.

The respective planar portions of the bolting faces 24a and 28a, at a position spaced radially outwardly from the central axis of the coupling segments, each continue into arcuate portions 24b and 28b which conveniently are of identical radii R1 and R2, each having its center A and B located on the opposite face 36, 38 of the bolting pads 16 and 20.

By arranging the radii R1 and R2 to be identical with each other, a symetrical configuration of the respective gasket segment is provided, assuming of course that both ends of the respective gasket segments are identically formed. If an asymetrical arranement of the coupling segments is to be provided, then, the respective radii can be of any convenient length, and be different one from the other.

As shown in the drawings, the centers A and B are spaced radially inwardly of the coupling from the center line C of the associated headed pin 34. This relationship is, however optional, in that the centers A and B can lie at any convenient position under the heads of the pins, provided that they are equally spaced radially from the central axis Z of the coupling.

Preferably, but not essentially, the respective outer faces 36 and 38 of the respective bolting pads 16 and 20 each are planar, and, are also co-planar with each other in the closed position of the coupling, the planar outer faces 36 and 38 terminating in a line lying parallel to the central axis of the coupling, i.e., a line formed by translating the centers A and B of the radii R1 and R2 parallel to the central axis Z of the respective coupling segments, and, thus of the assembled coupling. Thus, the centers A and B, when so translated provide fulcrums or hinge points in engagement with the under faces of the heads of the headed pin 34, the respective lines of engagment preferably, but again not essentially, being positioned at that side of the center line C of the headed pin which lies closer to the central longitudinal axis of the coupling.

At the points or hinge lines A and B, the outer faces 36 and 38 of the bolting pads 16 and 20 proceed into inwardly angled faces providing recesses in the outer faces of the respective bolting pads, and, which specifically are provided for reception of that portion of the heads of the pins 34, or, the head of the traction bolt 30 and nut 32 which lies on that side of the points or hinge lines A and B which is closest to the longitudinal axis Z of the coupling.

Referring now to FIG. 3 of the drawings, the coupling segments 10 and 12 are shown in a position in which they have connected to hinge one away from the other. For convenience of description, it is assumed that the coupling segment 12 remains absolutely stationary, and, that the coupling segment 10 is moving angularly with respect thereto. Such a condition would not of course occur in practice, unless, for example, the coupling segment 12 was to be held in a vise or otherwise held immobilized.

During hinging movement of the coupling segment 10 away from the coupling segment 12, the planar bolting faces 24a and 28a will move away from each other. This is permitted by fulcruming of the lines of engagement A and B of the outer bolting faces 36 and 38 with respect to the undersides of the heads of the pin 34. As the radii R1 and R2 are identical with each other, and have their centers A and B spaced identical distances from the central axis Z of the coupling, this produces rolling face engagement of the radiused portions 24b and 28b of the bolting faces.

The culmination of this rolling movement of the bolting pads of the coupling segments is such that the distance A-B between the respective lines of engagement A and B remains constant, and, the respective arcuate portions 24b and 28b of the bolting faces are maintained in continuous line engagement with each other.

Thus, the headed pin 34 will hinge or fulcrum about the points of engagement A and B, while at all times remaining in contact with the lines of engagement A and B, and, its longitudinal axis C will be displaced angularly in the plane of the coupling in order to accommodate this movement.

Ultimately, in the fully opened condition of the coupling, the heads of the pin 34 will become seated against the angled surfaces 40 and 42, this precluding further hinging movement of the coupling segment 10 relative to the coupling segment 12. As the radii R1 and R2 when combined are identical in length to the distance between the respective heads of the pin 34, further movement of the coupling segment 10 only could occur, either in the event that the heads of the pin 34 could move further away from each other, which, of course they cannot, or, one or both of the radii R1 and R2 could be reduced, which of course, is impossible.

Thus, and as illustrated in FIG. 4, at the time the heads of the pin 34 bottom down on the inclined faces 40 and 42, further hinging movement is inhibited in its entirety, and, in fact an extremely rigid interconnection is produced in the opened position of the coupling, the radiused portions 24b and 28b then being placed under compression.

It is emphasized that this rolling action of the respective coupling segments also can occur in the event that the points A and B are positioned further outwardly from the central axis Z and beyond the longitudinal axis C of the pin 34.

Exactly the same conditions obtain when the coupling segment 10 is moved in the opposite direction from the position shown in FIG. 4 to that shown in FIG. 2, the respective bolting faces 24 and 28 at that time rolling along the arcuate portions 24b and 28b until such time as the respective planar portions 24a, 28a thereof again reach face contact with each other as illustrated in FIG. 2.

Figure 5:
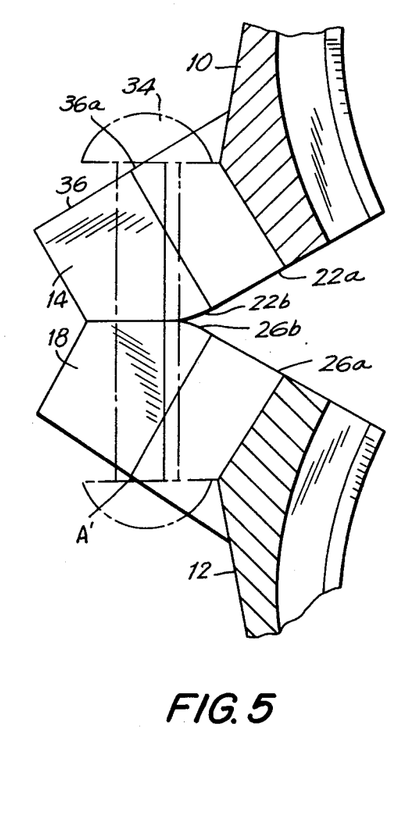
FIGS. 5, 6 and 7 are enlarged fragmentary sections corresponding with FIGS. 2, 3 and 4, and show an alternative configuration of the bolting pads.
Figure 6:
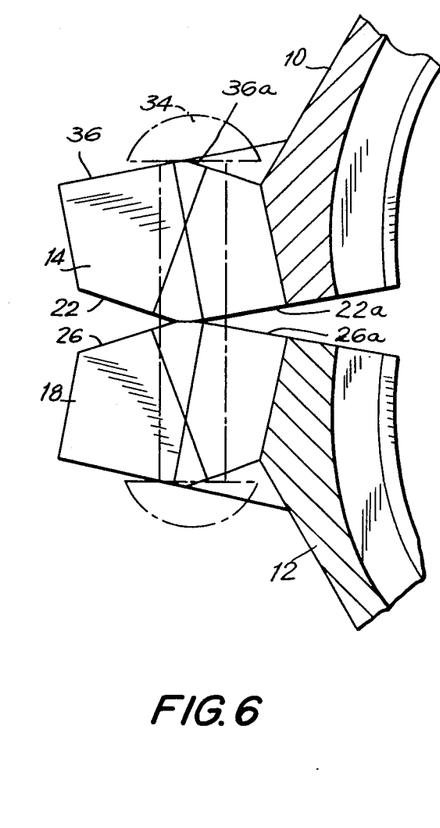
Figure 7:
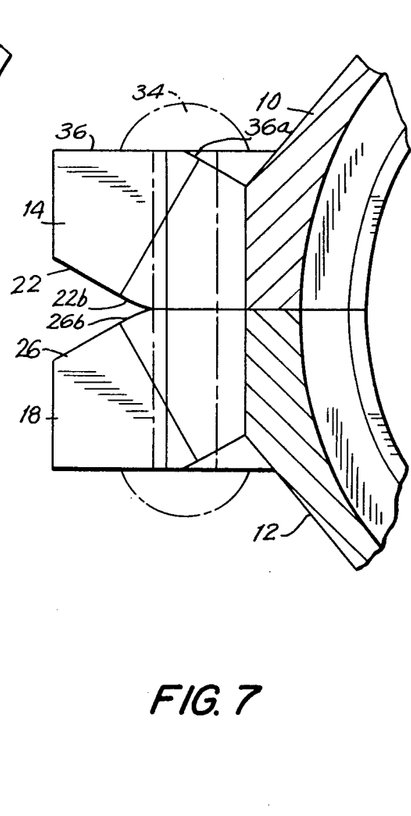

An alternative arrangement of the bolting pads 14 and 18 is illustrated in FIGS. 5, 6 and 7, in which a rolling action is provided not only at the rolling faces 22b and 26b, but also at the points of engagement 36a of the outer faces 36 of the bolting pads with the heads of the pins 34.

In FIGS. 5, 6 and 7, the points of rolling contact all lie on a single line, the distance between the points of contact with the heads of the pin 34 at all times remaining constant despite the angular positions of the coupling segments relative to each other.

By this arrangement, configurations of the rolling faces 22b and 26b can be provided, that while curved about the longitudinal axis of the respective faces are of a form other than truly circular about that longitudinal axis. In this manner, it is not required that the respective bolting pads be identical with each other in height.

Most surprisingly, throughout the rolling action of the faces 22b and 26b, or 24b and 28b relative to each other, the outward force exerted at the points A and B, and which acts in opposite directions along the central axis C of the headed pin 34 and directly on the heads of the pin 34, frictionally holds the pin and prevents it from falling out of the bolting pads under its own weight and gravity.

This aspect of the invention is of particular utility in those cases where the coupling is to be pre-assembled at the point of manufacture, in that the pin 34 can be inserted in the bolting pads by sliding or forcibly inserting the pin between the lugs of bolting pads, subsequent to which the pin can be pressed axially in order to conform its axial length between the planar underfaces of the heads exactly to the spacing between the outer faces 36 and 38 of the respective bolting pads 16 and 20. When so positioned, and sized to length, it is found that the pin can only be removed by the application of considerable mechanical force, the tendency being for the heads of the pin to form a ridge at the lines of hinging A and B which further precludes removal of the pin.

Figure 8:
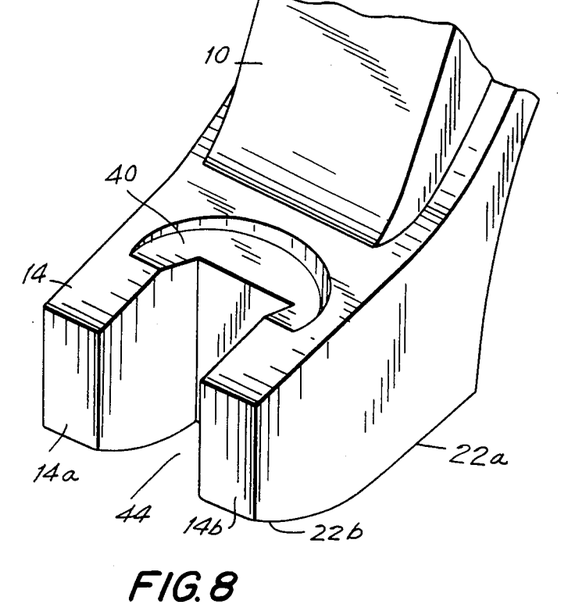
FIGS. 8 and 8A are fragmentary perspective views illustrating, respectively, alternative forms of the bolting pads of the coupling of FIG. 1.

Thus, and as is required in the event that a headed pin is to be used as the securing member, the respective bolting pads 14 and 18, or 16 and 20 can be provided with an open slot 44, as is illustrated in FIG. 8, and, as is clearly apparent from each of FIGS. 1 through 4, and FIGS. 5 through 7.

In the event that traction bolts are to be employed, then, there is no guaranteed that the head of the traction bolt will be positioned the exact required distance from the mutually presented face of the threaded nut. In this event, one of the bolting pads of each of the coupling segments is preferably formed as illustrated in FIG. 8A, i.e., a retaining bridge 46 is provided at the bolting pad at one end of each coupling segment, such that the bolt is retained captive in that end of the coupling segment without regard to the extent to which its nut has been tightened down.

Figure 8A:
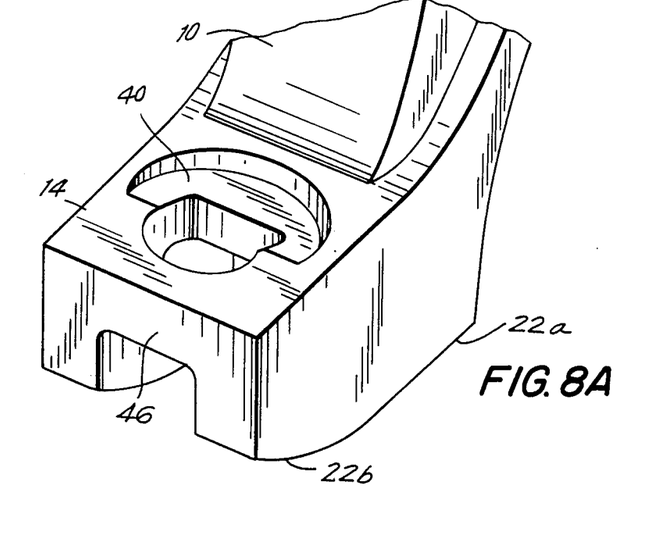

In FIGS. 8 and 8A, it is the bolting pad at the opposite end of the coupling segment 10 of FIGS. 2, 3 and 4 that has been illustrated, i.e., the bolting pad 14 providing the planar bolting face 22a and the arcuate face 22b.

While the construction of hinged coupling so far described will provide for ready hinging of the coupling segments 10 and 12 in substantially co-planar relationship with each other, the respective coupling segments 10 and 12 still have the opportunity of rotating relative to each other about the axis C of the headed pin 34, unless constraint against such movement is provided.

Such rotational movement is permitted by virtue of the fact that the arcuate faces 24b and 28b essentially are surfaces of cylinders of radius R1 and R2 having their longitudinal axis lying parallel to and spaced from each other. The opportunity thus exists of one of the cylindrical surfaces rotating angularly relative to the other about the axis C of the headed pin 34 unless some constraint is provided against such movement.

Figures 9, 10:
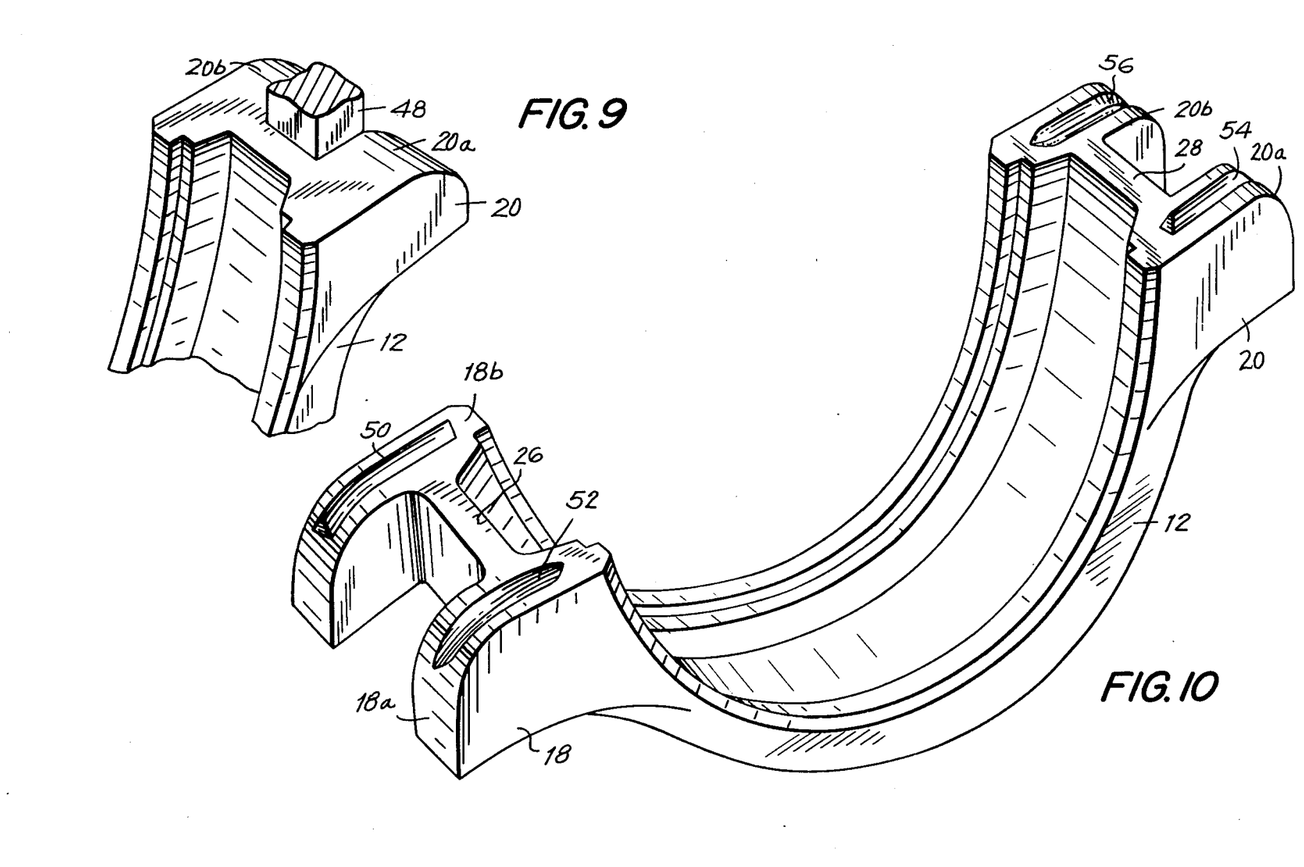
FIG. 9 is a fragmentary perspective view of the bolting face of the lowermost coupling segment as shown in FIG. 1, and illustrating one manner in which the respective coupling segments can be held against rotation relative to each other about the axis of the securing bolt or pin.
FIG. 10 is a perspective view of the lowermost coupling segment of FIG. 1, showing one alternative embodiment of a symmetrical gasket segment, which can comprise both the lower and upper gasket segment of FIG. 1.

FIG. 9 illustrates one convenient manner in which the required restraint can be provided, this being by providing a headed pin, such as the pin 34 or, a traction bolt such as the traction bolt 30, having a squared shank 48. By spacing the lugs of the bolting pads for them to embrace the squared outer surfaces of the shank 48, in the manner illustrated in FIG. 9, rotational movement of the coupling segments about the axis of the pin or bolt is prevented, while permitting the required hinging movement of the coupling segments. Such an assembly requires other than a conventional round shanked pin or traction bolt, and this raises the problem that a workman possibly would assemble the wrong pin or traction bolt into the coupling.

Thus, it is preferred that rotational movement of the respective coupling segments relative to each other be prevented in some other manner, and one which is equally effective when using pins or traction bolts having conventional cylindrical shanks.

This is readily accomplished according to the teachings of the present invention by forming the bolting faces of the respective bolting pads in such a manner that relative thereof about the axis of the securing pin or traction bolt is precluded, as is now discussed with reference to FIGS. 10 through 14 of the accompanying drawings.

Referring to FIG. 10, which illustrates the bolting faces 26 and 28 of the coupling segment 12, the respective bolting faces are each provided with a key or projection and recess that interfit with a corresponding projection and recess on the bolting faces 22 and 24 of the coupling segment 10, each of which extend radially of the axis of the respective coupling segments.

At this point, a further requirement emerges, particularly in the event that the coupling segments 10 and 12 are to be symmetrical with respect to each other.

This situation which is highly desirable, for otherwise, there is a possibility of a workman incorrectly attempting to assemble two coupling segments 10 to each other, or, incorrectly attempting to assemble two coupling segments 12 to each other.

In order to preclude this possibility, it is preferable that the coupling segments 10 and 12 be identical in all respects, and, that they interfit correctly with each other without regard to which way the bolting faces of the respective coupling segments are presented to each other.

As will be readily apparent from FIG. 1, the proper configuration is that in which the bolting pad 14 is presented to the bolting pad 18, and the bolting pad 16 is presented to the bolting pad 20. During assembly of the coupling, the possibility equally well exists of rotating the coupling segment 10 through 180 degrees to bring the bolting pad 14 into registry with the bolting pad 20, and, to bring the bolting pad 16 into registry with the bolting pad 18.

This raises a further requirement in the symmetry of the respective coupling segments if they are to be identical with each other, i.e., they must interfit correctly without regard to whether they are brought together in one position or the other.

This is accomplished as illustrated in FIG. 10 by providing one of the lugs 18b of the bolting pad 18 with an upstanding key 50, and by providing the other lug 18a with a corresponding groove 52.

Similarly, and in reverse, the lug 20a of the bolting pad 20 is provided with an upstanding key 54, and, the lug 20b is provided with a corresponding groove 56, the key 50 of an identical coupling segment 12 being receivable either within the groove 52 or the groove 56 of the coupling 12 of FIG. 10, and similarly, the key 54 being receivable either within the groove 52 or the groove 56 of an identical coupling segment, either when brought into engagement with the coupling segment 12 in one position, or reversed through 180 degrees relative thereto.

In an assembled coupling, the interengagement of the keys 50 and 54 within the respective grooves 52 and 56 acts to stabilize the respective coupling segments against rotation during hinging movement of the respective coupling segments.

Figure 11:
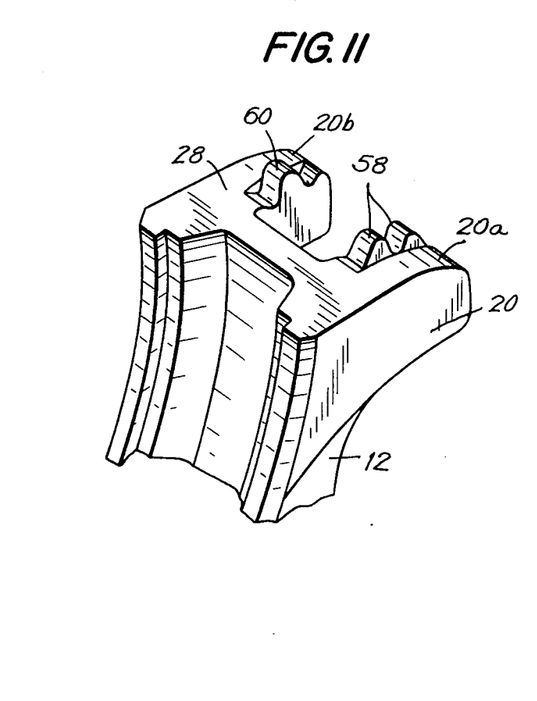
FIGS. 11 and 12 are fragmentary perspective views corresponding with FIG. 7, and which show alternative embodiments of symmetrical gasket segment structures.
Figure 12:
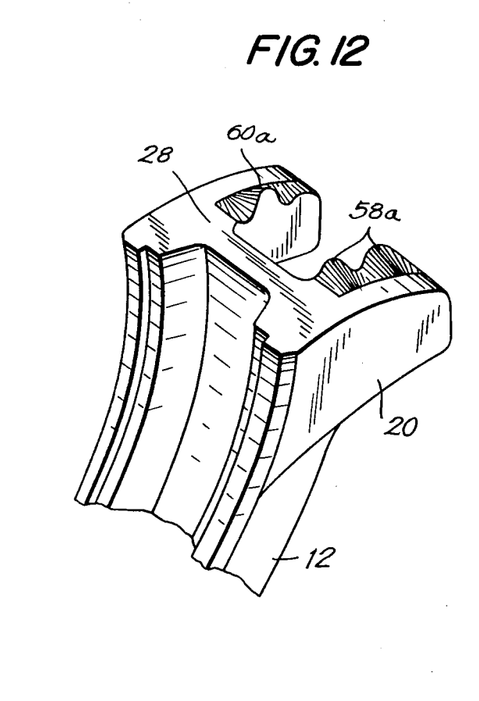

Alternative arrangements for preventing such relative rotational movement are illustrated in FIGS. 11 and 12, in which the respective ends of the coupling segments are provided with interfitting gear teeth of sinusoidal form.

Referring now to FIG. 11, the bolting pad 20 is provided on one lug 20a with two or more gear teeth 58 of sinusoidal form, and which are recessed within the lug 20a. Similarly, the lug 20b is provided with one or more complementary sinusoidal gear teeth 60 which is recessed within the lug 20b, the respective gear teeth 58 and 60 each being arranged on a gear tooth circle corresponding with the curvature of the bolting face 28. Thus, in identical manner with that described with reference to FIG. 10, an identical coupling segment can be assembled to the coupling segment 12 in either of two positions of reversal through 180 degrees.

In FIG. 11, lateral movement of the respective coupling segments is provided by the interengment of the teeth 58 and 60 with the walls of the recesses in the adjacent coupling segment, this precluding relative lateral movement between the bolting pads.

A modification of the embodiment of FIG. 11 is shown in the FIG. 12, and which is less difficult to manufacture by conventional casting processes. In FIG. 12, rather than for them to be formed as plain gear teeth extending parallel to the axis of the coupling, the respective gear teeth each are formed as conical surfaces which merge directly into the bolting face 28 without any sharp angled transistion, thus providing all of the benefits of the embodiment of FIG. 11 while miminizing manufacturing problems.

In the event that the coupling is to be pre-assembled at the point of manufacture, then, the requirement for symmetry of the respective coupling segments is of little importance, in that hinging movement is required at only one end of the coupling segments, and, the opposite ends of the coupling segments can be secured in any known manner, such as by employing entirely conventional bolting pads as the bolting pads 14 and 18 in FIG. 1, and, by limiting hinging movement to the bolting pads 16 and 20 of FIG. 1.

If an assymetrical arrangement of the coupling segments is permissible, then, a multitude of alternative approaches to inhibiting rotational movement between the respective gasket segments at the hinge of the coupling present themselves.

Figure 13:
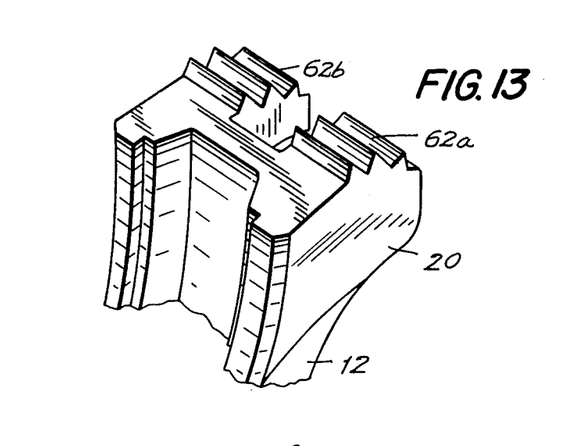
FIGS. 13 and 13A, respectively are a fragmentary perspective view of one bolting pad of a coupling segment, and, a front view showing a pair of coacting bolting pads in assembled relationship, the embodiment of FIG. 13 being asymmetrical and, being primarily intended for use in instances in which the opposite ends of the gasket segment are provided with conventional bolting pads; and, FIGS. 14 and 14A correspond with FIGS. 13 and 13A, and show an alternative embodiment of dissimilar bolting pads at one end of the gasket segments, again resulting in an asymmetrical arrangement of the coupling segments.
Figure 13A:
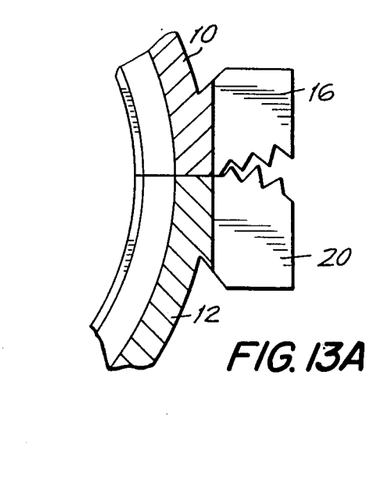

For example and as illustrated in FIGS. 13 and 13a, the bolting pads 16 and 20 each can be provided with linear gear teeth arranged in axial alignment with each other.

This arrangement of the structures of FIGS. 13 and 13A is equally effective in preventing relative rotation between the coupling segments 10 and 12, but, suffers the disadvantage that the resulting coupling segments will be assymetrical, unless, of course, the gear teeth 62a are appropriately offset with respect to the gear teeth 62b, as previously described with reference to the embodiments of FIGS. 11 and 12.

Figure 14:
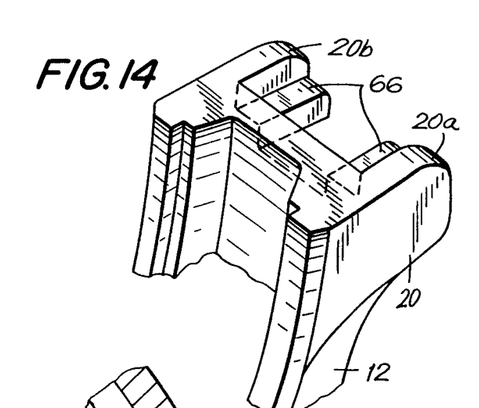
Figure 14A:
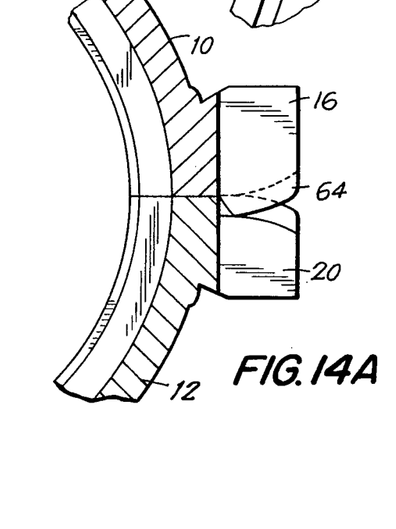

A similar assymetrical arrangement of coupling sements is illustrated in FIG. 14 and 14A, in which the respective lugs of the bolting pads 16 are provided with downwardly extending tongues 64 which are received within corresponding recesses 66 provided in the lugs 20a and 20b of the adjacent bolting pad 20.

An additional benefit of the invention is that each of the coupling segments described above can readily be manufactured using precision casting techniques and in the total absence of subsequent form finishing of the castings. The unfinished and 'as cast' form of the arcuate portions of the bolting faces in fact provides a distinct advantage over machine finished forms, in that it further militates against slipage at the rolling faces relative to each other and in turn further militates against rotation of one coupling segment relative to the other about the axis of the securing pin or bolt.

It will be understood that the embodiments discussed above are preferred embodiments of the invention, and, that various modifications maybe made in the structures disclosed without departing from the scope of the following claims.

I claim:

1. A coupling segment for a hingeable segmented pipe coupling, including;
    an arcuate member having an internal recess for the reception of a sealing gasket; and,
    bolting pads at the respective ends of said arcuate member for the reception of securing members, whereby a plurality of said coupling segments can be assembled into a segmented pipe coupling; further including
    at least one said bolting pad including a planar bolting face portion and an opposite face portion extending radially of the longitudinal axis of said coupling segment, and, an arcuate bolting face portion providing an outward continuation of said planar bolting face portion;
    said arcuate bolting face portion comprising a curved surface having its longitudinal axis of generation extending parallel to said opposite face of said bolting pad and extending parallel to the longitudinal axis of said coupling segment;
    said opposite face of said bolting pad terminating adjacent said arcuate member in a recessed portion extending inwardly at an angle relative to said planar bolting face portion and towards the longitudinal axis of said coupling segment.

2. The coupling segment of claim 1, in which said opposite face of said bolting pad is planar and extends parallel to said planar bolting face portion.

3. The coupling segment of claim 1, in which said bolting pad is bifurcated and provides a slot having a longitudinal axis extending transversely with respect to the plane of said planar bolting face portion, said slot being for the reception of a said securing member.

4. The coupling segement of claim 3, in which said slot is rectangular in transverse cross-section, and is adapted to cooperate with a securing member having a corresponding rectangular cross-section.

5. The coupling segment of claim 1, in which said bolting pad is bifurcated, and includes a transverse web for the retention and location of a said securing member.

6. The coupling segment of claim 1, in which said arcuate bolting face portion is provided with positioning and locating formations thereon extending parallel to said longitudinal axis of said arcuate bolting face portion.

7. The coupling segment of claim 6, in which said positioning and locating formations are in the form of gear teeth.

8. The coupling segment of claim 7, in which said gear teeth are at least partially recessed within said arcuate bolting face portion, and arcuate said bolting face portion is of greater width in the direction of the longitudinal axis of the coupling segment than is the width of the gear teeth in that axial direction.

9. The coupling segment of claim 6, in which said positioning and locating formations comprise key and socket members for cooperation with corresponding formations on a complimentary other said coupling segment.

10. The coupling segment of claim 1, in which said planar bolting face portion and said arcuate bolting face portion each include positioning and locating formations thereon, said positioning and locating formations extending radially of the axis of said coupling segment.

11. The coupling segment of claim 10, including a first said positioning and locating formation comprised by a key, and a second positioning and locating formation provided by a channel of complementary transverse cross-section to the transverse cross-section of said key.

12. The coupling segment of claim 1 in combination with an identical said coupling segment to provide a segmented pipe coupling.

13. The coupling segment of claim 1, in combination with an additional said coupling segment positioned relative thereto with said bolting faces of the respective bolting pads of said coupling segments in face engagement, further including a securing member extending between said opposite faces of said respective bolting pads, said securing member including engagement members providing spaced mutually presented surfaces respectively engaged with said opposite faces of said bolting pads.

14. A segmented coupling assembled from at least two of said coupling segments of claim 1.

15. A coupling segment for a hingeable segmented pipe coupling, including:
- an arcuate member having an internal recess for the reception of a sealing gasket; and,
- bolting pads at the respective ends of said arcuate member for the reception of securing members, whereby a plurality of said coupling segments can be assembled into a segmented pipe coupling:
- each bolting pad including a planar bolting face portion and an opposite face portion extending radially of the longitudinal axis of said coupling segment, and, an arcuate bolting face portion providing an outward continuation of said planar bolting face portion;
- each said arcuate bolting face portion comprising a curved surface having its longitudinal axis of generation extending parallel to said opposite face of the associated bolting pad and extending parallel to the longitudinal axis of said coupling segment;
- each said opposite face of said bolting pads terminating adjacent said arcuate member in a recessed portion extending inwardly at an angle relative to said planar bolting face portion and towards the longitudinal axis of said coupling segment.

16. The coupling segment of claim 15, in which said opposite face of each bolting pad is planar and extends parallel to the associated said planar bolting face portion.

17. The coupling segment of claim 15, in which each said bolting pad is bifurcated and provides a slot having a longitudinal axis extending transversely with respect to the plane of said planar bolting face portion, said each said slot being for the reception of a said securing member.

18. The coupling segment of claim 17, in which each said slot is rectangular in transverse cross-section, and is adapted to cooperate with a securing member having a corresponding rectangular cross-section.

19. The coupling segment of claim 15, in which each said bolting pad is bifurcated, and at least one of said bolting pads includes a transverse web for the retention and location of a said securing member.

20. The coupling segment of claim 15, in which each said arcuate bolting face portion is provided with positioning and locating formations thereon extending parallel to said longitudinal axis of the associated said arcuate bolting face portion.

21. The coupling segment of claim 20, in which each said positioning and locating formation is in the form of gear teeth.

22. The coupling segment of claim 21, in which said gear teeth are at least partially recessed within the associated arcuate bolting face portion, and each said arcuate bolting face portion is a greater width in the direction of the longitudinal axis of said coupling segment than is the width of the associated gear teeth in that axial direction.

23. The coupling segment of claim 20, in which each of said positioning and locating formations comprises key and socket member for cooperation with corresponding formations of a complimentary other said coupling segment.

24. The coupling segment of claim 20, in which said positioning and locating formations are arranged in symmetry on each said bolting face, whereby a first said coupling segment can be assembled to an identical second said coupling segment without regard to which ones of the bolting pads of said second coupling segment are presented to a specific one of the bolting pads of said first coupling segment.

25. A segmented coupling assembled from at least two of said coupling segments of claim 20.

26. The coupling segment of claim 15, in which each said planar bolting face portion and each said arcuate bolting face portion includes locating and positioning formations thereon, said locating and positioning formations extending radially of the axis of said coupling segment.

27. The coupling segment of claim 26, in which each said bolting pad includes a first locating and positioning formation comprised by a key, and a second locating and positioning formation provided by a channel of complimentary transverse cross-section to the transverse crosssection of said key.

28. The coupling segment of claim 26, in which said positioning and locating formations are arranged in symmetry on each said bolting face, whereby a first said coupling segment can be assembled to an identical said coupling segment without regard to which ones of the bolting pads of said second coupling segment are presented to a specific one of the bolting pads of said first coupling segment.

29. A segmented coupling assembled from at least two of said coupling segments of claim 26.

30. The coupling segment of claim 15, in combination with an additional said coupling segment positioned relative thereto with said bolting faces of at least one pair of bolting pads in face engagement, further including securing means extending between said opposite faces of said at least one pair of bolting pads, said securing member including engagement members providing parallelly spaced mutually presented surfaces respectively engaged with said opposite faces.

31. A segmented coupling assembled from at least two of said coupling segments of claim 15.

32. A hinged segmented pipe coupling provided by:
- at least two arcuate members each having an internal recess for the reception of a sealing gasket;
- bolting pads at the respective ends of each said arcuate member; and
- securing members respectively securing one bolting pad of each said arcuate member to an adjacent bolting pad of an adjacent arcuate member;

at least one pair of said bolting pads each including a planar bolting face portion and an opposite face portion extending parallel to the longitudinal axis of said arcuate members, and, an arcuate bolting face portion providing an outward continuation of said planar bolting face portion;

the respective said arcuate bolting face portions each comprising a curved surface having its longitudinal axis of generation extending parallel to said opposite face of the associated bolting pad, and extending parallel to the central longitudinal axis of said coupling;

each said opposite face of each said bolting pad terminating adjacent said arcuate member in a recessed portion extending inwardly at an angle relative to said planar bolting face portion and towards the longitudinal axis of said coupling.

* * * * *